United States Patent
Yamamoto et al.

(10) Patent No.: US 8,511,193 B2
(45) Date of Patent: Aug. 20, 2013

(54) SUPPORTING STRUCTURE OF SHAFT OF REDUCTION GEAR

(75) Inventors: Akira Yamamoto, Obu (JP); Mitsuhiro Tamura, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 192 days.

(21) Appl. No.: 12/569,065

(22) Filed: Sep. 29, 2009

(65) Prior Publication Data
US 2010/0086248 A1 Apr. 8, 2010

(30) Foreign Application Priority Data
Oct. 8, 2008 (JP) ................... 2008-262117

(51) Int. Cl.
F16H 1/20 (2006.01)
F16H 57/02 (2012.01)

(52) U.S. Cl.
USPC .......................................... 74/423; 74/606 R

(58) Field of Classification Search
USPC ................ 74/412 R, 416, 417, 421 A, 421 R, 74/423, 606 R; 464/178; 254/342, 344; 384/455, 548, 559, 565, 569, 571, 618, 619; 475/162, 163, 168
See application file for complete search history.

(56) References Cited

U.S. PATENT DOCUMENTS

| | | | | |
|---|---|---|---|---|
| 2,873,615 | A * | 2/1959 | Wiken | 74/410 |
| 4,357,840 | A * | 11/1982 | Winzeler | 475/205 |
| 4,729,252 | A * | 3/1988 | Huber et al. | 74/417 |
| 5,178,027 | A * | 1/1993 | Kobayashi et al. | 74/412 R |
| 5,302,031 | A * | 4/1994 | Yuasa | 384/449 |
| 5,354,245 | A * | 10/1994 | Wallace | 475/207 |
| 5,816,102 | A * | 10/1998 | Kern et al. | 74/412 R |
| 5,961,221 | A * | 10/1999 | Kamimura | 384/447 |
| 7,651,276 | B2 * | 1/2010 | Nied et al. | 384/557 |
| 7,762,725 | B2 * | 7/2010 | Fahrni et al. | 384/583 |
| 2003/0106384 | A1* | 6/2003 | Yokota et al. | 74/424 |
| 2004/0228561 | A1* | 11/2004 | Okugami et al. | 384/569 |
| 2005/0185873 | A1* | 8/2005 | Musso | 384/571 |
| 2005/0238273 | A1* | 10/2005 | Kawamura et al. | 384/504 |
| 2006/0070471 | A1* | 4/2006 | Matsuoka | 74/417 |
| 2010/0080498 | A1* | 4/2010 | Tamura et al. | 384/585 |

FOREIGN PATENT DOCUMENTS

| | | |
|---|---|---|
| JP | 01116316 | 5/1989 |
| JP | 2006009929 | 1/2006 |
| JP | 2006-207828 | 8/2006 |
| JP | 2006207828 A * | 8/2006 |
| JP | 2007-211920 | 8/2007 |

* cited by examiner

*Primary Examiner* — Thomas R Hannon
*Assistant Examiner* — Adam D Rogers
(74) *Attorney, Agent, or Firm* — Squire Sanders (US) LLP

(57) ABSTRACT

A first shaft at which a first gear is provided is supported by an angular roller bearing in which a pair of roller rows and which is rolling elements incorporated in a back-to-back combination, and a midpoint of a projection range of a range where the first gear and a second gear mesh with each other on the first shaft is made to exist in a span of a working point of the pair of roller rows of the angular roller bearing on the pinion shaft.

6 Claims, 5 Drawing Sheets

SUPPORTING STRUCTURE OF SHAFT OF REDUCTION GEAR

BACKGROUND OF THE INVENTION

1. Field of the Invention

The present invention relates to a supporting structure of a shaft of a reduction gear.

Priority is claimed on Japanese Patent Application No. 2008-262117, filed Oct. 8, 2008, the content of which is incorporated herein by reference.

2. Description of Related Art

A structure, as shown in FIG. 4, which supports a pinion shaft 14 at the tip of which a bevel pinion 12 is formed in a reduction gear 10 is disclosed in Japanese Unexamined Patent Application Publication No. 2006-207828 (FIG. 2). The reduction gear 10 includes a speed reduction mechanism 13 (only a portion is shown) having the inscribed meshing planetary gear structure at its preceding stage, and the pinion shaft 14 is connected with a carrier 16 which is an output shaft of the speed reduction mechanism 13 at the preceding stage via a spline 18. Further, the pinion shaft 14 is supported by a casing 27 by a tapered roller bearing 24 disposed almost at the center of the pinion shaft 14, and a tapered roller bearing 26 disposed at a cylindrical portion 16A of the carrier 16 via the carrier 16. That is, the load in a radial direction and the load in a thrust direction applied to the pinion shaft 24 are shared and received by both the tapered roller bearings 24 and 26.

On the other hand, a reduction gear 28, as shown in FIG. 5, which supports a bevel pinion 32 integrated with a joint shaft 30 by one pair of ball bearings 34 and 36 is disclosed in Japanese Unexamined Patent Application Publication No. 2007-211920 (FIG. 1). The axial movement of one pair of ball bearings 34 and 36 is restrained by a stepped portion 38A of the casing 38, a stage portion 30A of the joint shaft 30, and a retaining ring 40. In this reduction gear 28, the thrust loads in an A direction and in a B direction generated in the bevel pinion 32 are received by one pair of ball bearings 34 and 36 whose axial movement have been restrained.

As such, when a shaft which generates a thrust load, especially during operation, like a shaft including a bevel pinion, is supported by the casing of the reduction gear, a supporting structure which can simultaneously cope with the load in the radial direction and the load in the thrust direction is required.

Therefore, a configuration in which the shaft is supported at both ends by one pair of bearings in order to receive the radial load and a configuration in which the axial movement of an inner ring or outer ring of a bearing is restrained in order to receive the thrust load are required, and it is necessary to increase the span of one pair of bearings in order to secure stable support. As a result, there is a problem in that axial length becomes large.

SUMMARY OF THE INVENTION

It is desirable to reduce the burden on a bearing even if a shaft of a reduction gear is, for example, a shaft to which both the loads in a radial direction and in a thrust direction are applied in supporting of the shaft, thereby enabling the shaft to be supported by a casing in a stable state without increasing the axial length of the reduction gear.

According to an embodiment of the invention, there is provided a supporting structure of a shaft of a reduction gear having within a casing a speed reduction mechanism formed by the meshing between a first gear provided at the tip of a first shaft and a second gear provided at a second shaft. The supporting structure includes an angular roller bearing which supports the first shaft provided with the first gear. The angular roller bearing has a pair of roller rows which is rolling elements incorporated in a back-to-back combination. The first shaft at which the first gear is provided is supported by an angular roller bearing in which a pair of roller rows which is rolling elements incorporated in a back-to-back combination. A midpoint of a projection range of a range where the first gear and the second gear mesh with each other on the first shaft is made to exist in a working point span of the pair of roller rows of the angular roller bearing on the first shaft.

The reduction gear of an embodiment of the invention has a speed reduction mechanism formed by the meshing between a first gear provided at the tip of a first shaft and a second gear provided at the second shaft. In the invention, the first shaft of the speed reduction mechanism is supported by an angular roller bearing in which "roller rows" which is rolling elements incorporated in a back-to-back combination. In addition, the angular roller bearing itself may be a single bearing having the pair of roller rows in a double row type, and may be two bearings which have the pair of roller rows separately. In the invention, a midpoint of a projection range of a range where the first gear and the second gear mesh with each other on the first shaft, in short, a "base point (working point)" where the load from the first gear is applied to the first shaft is made to exist in a working point span of the pair of roller rows of the angular roller bearing on the first shaft. Accordingly, the burden on the bearing can be lightened, and the first shaft can be supported in an extremely stable state (for example, even if the axial span of the pair of roller rows is small), by making the base point which the load from the first gear is applied fall within the span of the line of action of the pair of roller rows of the angular roller bearing.

In addition, when an embodiment of the invention is applied to the support of a shaft to which loads are applied in both the radial direction and the thrust direction like a shaft in which an orthogonal gear, such as a bevel pinion or a hypoid pinion, is incorporated, particularly remarkable effects are obtained. However, the shaft to which the invention is applied is not necessarily a shaft to which both loads are always applied.

According to an embodiment of the invention, it is possible to reduce the burden on a bearing even if the shaft of the reduction gear is, for example, a shaft to which the loads in the radial direction and the thrust direction are applied, thereby enabling the shaft to be supported by the casing in a stable state without increasing the axial length of the reduction gear.

DETAILED DESCRIPTION OF THE INVENTION

Hereinafter, an embodiment of the invention will be described in detail with reference to the drawings.

Figure 1:
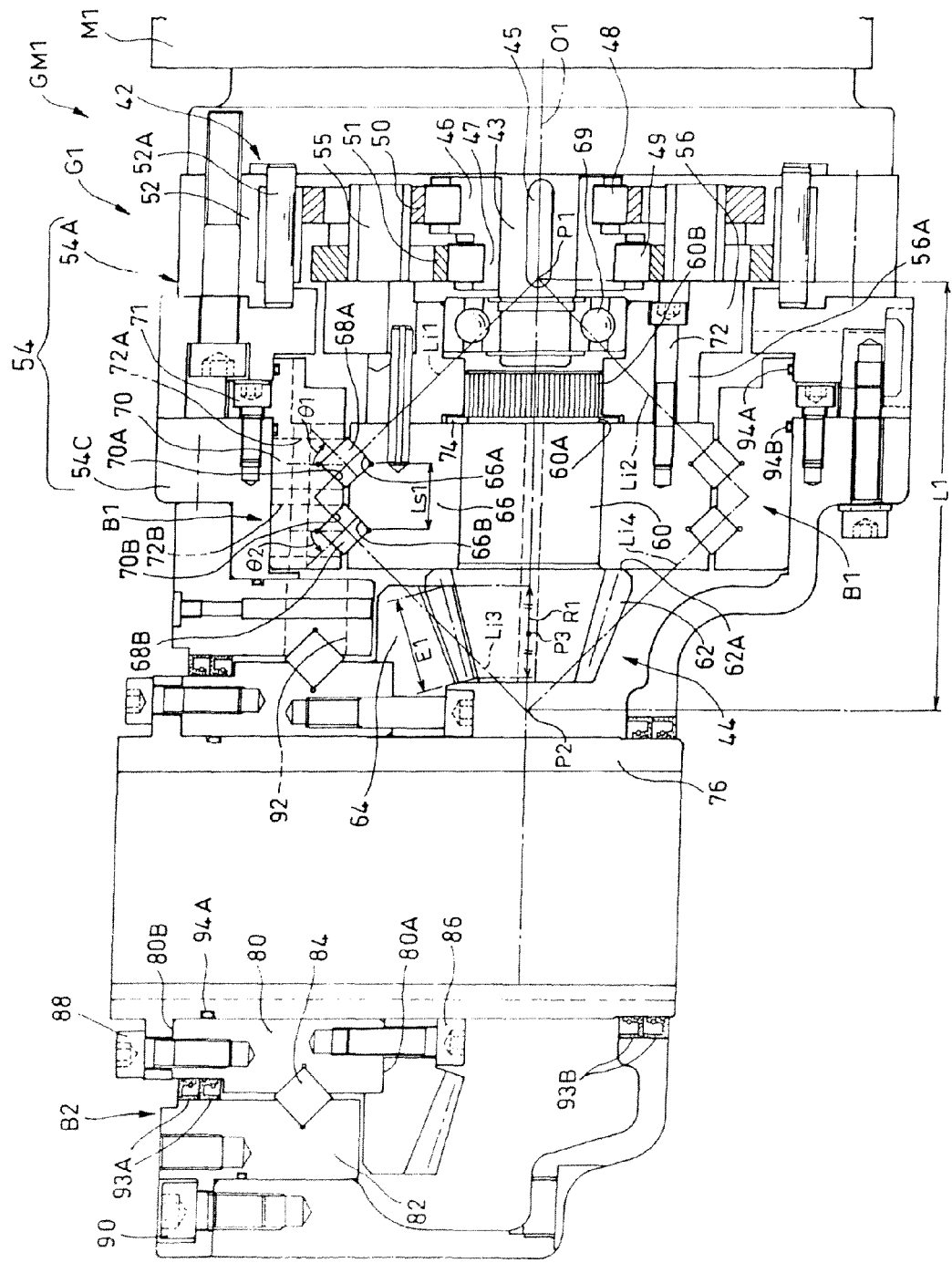
FIG. 1 is a sectional view of a reduction gear according to a first embodiment of the invention.
Figure 2:
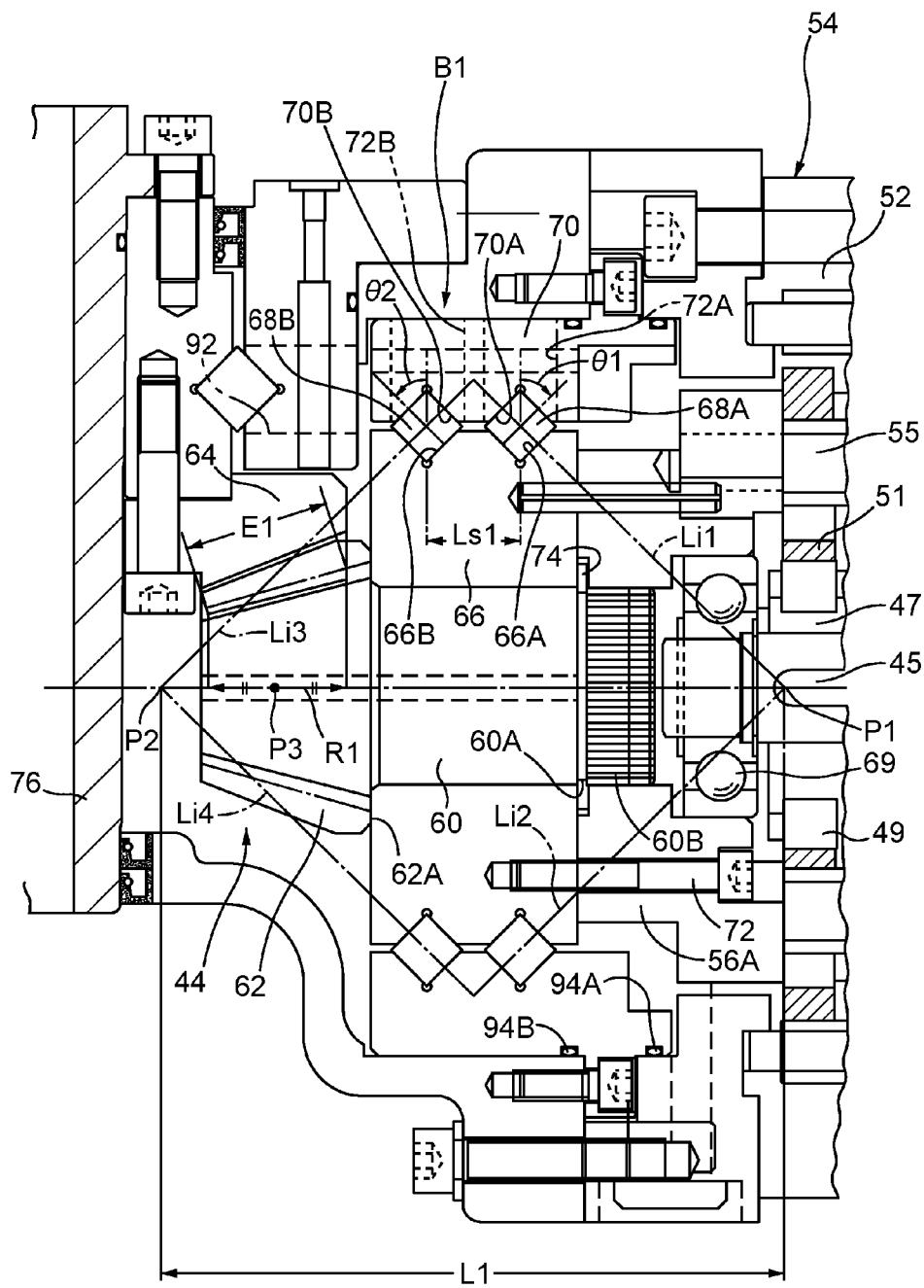
FIG. 2 is an enlarged view of essential parts of FIG. 1.

FIG. 1 is a sectional view of a reduction gear to which an example of a supporting structure of a shaft of the reduction gear according to the invention has been applied, and FIG. 2 is an enlarged view of essential parts of FIG. 1.

A reduction gear GM1 has a speed reducer G1 and a motor M1 connected with the speed reducer G1.

The speed reducer G1 includes a speed reduction mechanism 42 of an inscribed meshing planetary gear structure at its preceding stage, and an orthogonal speed reduction mechanism 44 composed of a bevel gear set at its subsequent stage. Accordingly, the reduction gear GM1 constitutes an orthogonal reduction gear in which the axis of an output shaft of the speed reducer G1 is orthogonal to the axis of the motor M1.

The speed reduction mechanism 42 of the inscribed meshing planetary gear structure at the preceding stage includes eccentric bodies 46 and 47 incorporated into the outer periphery of a motor shaft 43 of the motor M1 via a key 45, external gears 50 and 51 rockably and rotatably incorporated into the outer peripheries of the eccentric bodies 46 and 47 via rollers 48 and 49, and an internal gear 52 with which the external gears 50 and 51 internally mesh. The internal gear 52 is integrated with a casing 54A at the preceding stage, and the internal teeth thereof are constituted by pins 52A. The external gears 50 and 51 and the internal gear 52 have a slight difference in the number of teeth of, for example, about one to four. The speed reduction mechanism 42 of the inscribed meshing planetary gear structure outputs the relative rotation between the external gears 50 and 51 and the internal gear 52 to the orthogonal speed reduction mechanism 44 at the subsequent stage via a carrier 56 which is an output member via an inner pin 55.

The orthogonal speed reduction mechanism 44 at the subsequent stage includes a pinion shaft (first shaft) 60 equivalent to the input shaft thereof. A bevel pinion (the first gear) 62 is directly formed at the tip of the pinion shaft 60. The bevel pinion 62 meshes with a bevel gear (second gear) 64. The bevel gear 64 is incorporated into an output shaft (second shaft) 76.

The pinion shaft 60 is rotatably supported by the casing 54 (54C) by a double-row type angular roller bearing B1. The double-row type angular roller bearing B1 is composed of an inner ring 66, a first angular roller row 68A and a second angular roller row 68B disposed on the same plane, and an outer ring 70.

The outer ring 70 of the angular roller bearing B1 is fixed to the casing 54C at the subsequent stage via a bolt 71. Outer-ring-side first and second V-grooves (outer-ring-side first and second transfer surfaces) 70A and 70B of with an angle of 90° are bored at the inner periphery of the outer ring 70. Inner-ring-side first and second V-grooves (inner-ring-side first and second transfer surfaces) 66A and 66B of with an angle of 90° are bored at the outer periphery of the inner ring 66 of the angular roller bearing B1. The first angular roller row (rolling element row) 68A of the angular roller bearing B1 is incorporated into a space on the first transfer surfaces 66A and 70A one by one via pockets 72A provided in the outer ring 70. The second angular roller row (rolling element row) 68B of the angular roller bearing B1 is incorporated into a space on the second transfer surfaces 66B and 70B one by one via pockets 72B provided in the outer ring 70. The incorporation aspect of the first and second angular roller rows 68A and 68B is so-called a back-to-back combination. In this embodiment, since the contact angles θ1 and θ2 of the first and second angular roller rows 68A and 68B are set to 45 degrees, respectively, as shown by a two-dot chain line in FIG. 1, lines of action Li1 and Li2 are formed at an angle of about 90 degrees from the first angular roller row 68A (passing through the center of each roller), and lines of action Li3 and Li4 are formed at an angle of about 90 degrees from the second angular roller row 68B (passing through the center of each roller). The reason why the contact angles θ1 and θ2 are set to 45 degrees is because it was considered that cross-rollers can be diverted, and stress balances in a radial direction and in a thrust direction are also good. Although every two lines of action Li1 and Li2, and lines of action Li3 and Li4 are representatively depicted in the drawing, respectively, the lines of action exist about respective rollers of the first and second angular roller rows 68A and 68B. When the distance (span between working points P1 and P2 on the pinion shaft 60) between points (working points) P1 and P2 where the lines of action Lit to Li4 cross the axis O1 of the pinion shaft 60 is set to L1, a midpoint (base point to which the load of meshing is applied) P3 of a projection range R1 of an meshing range E1 between the bevel pinion 62 and the bevel gear 64 on the pinion shaft 60 is designed so as to exist within the distance L1. Since the first and second angular roller rows 68A and 68B are incorporated by a back-to-back combination, and the contact angles θ1 and θ2 thereof are set to 45°, the working points P1 and P2 are located at the other diagonal vertexes of a square having the position of the outer ring 70 of the angular roller bearing B1 as diagonal vertexes. Reference numeral L1 in the drawing is equivalent to the span between the working points P1 and P2.

In addition, the axial movement of the pinion shaft 60 of the orthogonal speed reduction mechanism 44 at the subsequent stage toward the bevel pinion 62 is regulated by a groove 60A formed at an outer periphery of the pinion shaft 60, and a retaining ring 74 fitted into the groove 60A. As the retaining ring 74 is pinched between the inner ring 66 and the carrier 56, the axial movement thereof is regulated. In addition, the axial movement of the pinion shaft 60 towards the side opposite to the pinion is regulated as an end 62A of the bevel pinion 62 abuts on the inner ring 66. Further, the bidirectional axial movement may be regulated only by the retaining ring 74 as long as a gap can be filled up with high precision.

The pinion shaft 60 has a knurled portion 60B on the side of the preceding stage speed reduction mechanism, and the knurled portion 60B is press-fitted into the inner periphery of a cylindrical portion 56A of the carrier 56 at the preceding stage. The carrier 56 is a rotational member (output member of the preceding stage speed reduction mechanism) which rotates at the same rotating speed coaxially with the pinion shaft (first shaft) 60, and the inner ring 66 of the angular roller bearing B1 is directly fixed via a bolt 72. In addition, a portion of the carrier 56 is supported by the motor shaft 43 via a bearing 69. In this embodiment, as mentioned above, the pinion shaft 60 is press-fitted into the inner ring 66 of the angular roller bearing B1. Therefore, the carrier 56, the pinion shaft 60, and the inner ring 66 are eventually integrated as a large rotational member as a whole. In addition, if priority is given to ease of assembling, transmission of power is sufficiently allowed only by the knurled portion 60B. Therefore, the fitting between the pinion shaft 60 and the inner ring 66 may not be necessarily press fitting. In this case, the radial load and thrust load applied to the pinion shaft 60 are transmitted to the inner ring 66 of the angular roller bearing B1 in the path of the knurled portion 60B→carrier 56→bolt 72, and are received by the inner ring 66. Accordingly, the precision of the portion of the pinion shaft 60 which faces the inner ring can be relaxed, and machining cost can be reduced.

An output shaft 76 of the orthogonal speed reduction mechanism 44 is supported by a cross-roller bearing B2. The cross-roller bearing B2 is mainly composed of an inner ring 80, an outer ring 82, and cross-rollers (rolling elements) 84 disposed between the inner ring 80 and the outer ring 82.

The bevel gear 64 is connected with an axial end 80A of the inner ring 80 of the cross-roller bearing B2 via a bolt 86, and the output shaft 76 is fixed to an opposite axial end 80B via a bolt 88. The outer ring 82 of the cross-roller bearing B2 is connected with and supported by the casing 54 (54C) via a bolt 90. The cross-rollers (rolling elements) 84 of the cross-roller bearing B2 are incorporated in a state where the rotational axis thereof is alternately changed 90° via pockets 92 provided in the radial direction of the outer ring 82.

In addition, reference numerals 93A and 93B of the drawing represent oil seals, and reference numerals 94A and 94B represent O rings.

Next, the operation of the reduction gear GM1 according to this embodiment will be described.

When the eccentric bodies 46 and 47 are rotated by the rotation of the motor shaft M1, the external gears 50 and 51 are guided by the outer peripheries of the eccentric bodies 46 and 47 (via the rollers 48 and 49), and rockingly rotate while being inscribed in the internal gear 52. In this embodiment, since the internal gear 52 is fixed to the casing 54 (54A), the free rotation of the external gears 50 and 51 is restrained, and only almost rocking is performed inside the internal gear 52. As a result, the relative rotation resulting from a difference in the number of teeth occurs between the internal gear 52 and the external gears 50 and 51. This relative rotation component is transmitted to the carrier 56, which is equivalent to the output shaft of the speed reduction mechanism 42, via the inner pin 55.

When the carrier 56 rotates, the carrier 56, the inner ring 66, and the pinion shaft 60 integrally rotate as a large lump by the press fitting between the knurled portion 60B of the pinion shaft 60, and the inner periphery of the cylindrical portion 56A of the carrier 56, the connection between the carrier 56, and the inner ring 66 of the angular roller bearing B1 via the bolt 72, and the press fitting between the inner ring 66 and the pinion shaft 60. Accordingly, when the pinion shaft 60 rotates, the bevel pinion 62 directly formed at the tip of the pinion shaft 60 rotates, and the bevel gear 64 which meshes with the bevel pinion 62 rotates.

The bevel gear 64 is directly fixed via the bolt 86 to the axial inside of the inner ring 80 of the cross-roller bearing B2. For this reason, the inner ring 80 rotates at the same rotating speed as the bevel gear 64. On the other hand, since the inner ring 80 is fixed to the output shaft 76 via the bolt 88, the rotation of the bevel gear 64 is transmitted to the output shaft 76 as it is.

Here, the pinion shaft 60 at the subsequent stage is supported by the angular roller bearing B1 which is combined back to back such that the contact angles θ1 and θ2 are 45°, and the midpoint P3 of the projection range R1 of the range E1 where the bevel gear 64 meshes with the bevel pinion 62 on the pinion shaft 60 exists within the span L1 of the working points P1 and P2 of the angular roller bearing B1 which is combined back to back. Further, the angular roller bearing B1 has a distance Ls1 in the axial direction, and has the first transfer surfaces 66A and 70A of the first angular roller row 68A, and the second transfer surfaces 66B and 70B of the second angular roller row 68B (double-row type). Accordingly, although a bearing itself is one, the loads in the radial direction and the thrust direction, which are applied to the pinion shaft 60 with the midpoint P3 as a base point can be stably received by the angular roller bearing B1.

Moreover, in this embodiment, (A) the carrier 56 which is an output shaft at the preceding stage is directly fixed to the inner ring 66 of the angular roller bearing B1 via the bolt 72, (B) a portion of the carrier 56 is supported by the motor shaft 43 via the bearing 69, (C) the knurled portion 60B of the pinion shaft 60 is press-fitted into the inner periphery of the cylindrical portion 56A of the carrier 56, and (D) the pinion shaft 60 is press-fitted into the inner ring 66 of the angular roller bearing B1. For this reason, the carrier 56, the pinion shaft 60, and the inner ring 66 of the angular roller bearing B1 stably rotate as a large lump as a whole, so that the pinion shaft 60 can be rotated in a significantly stable state.

Figure 3:
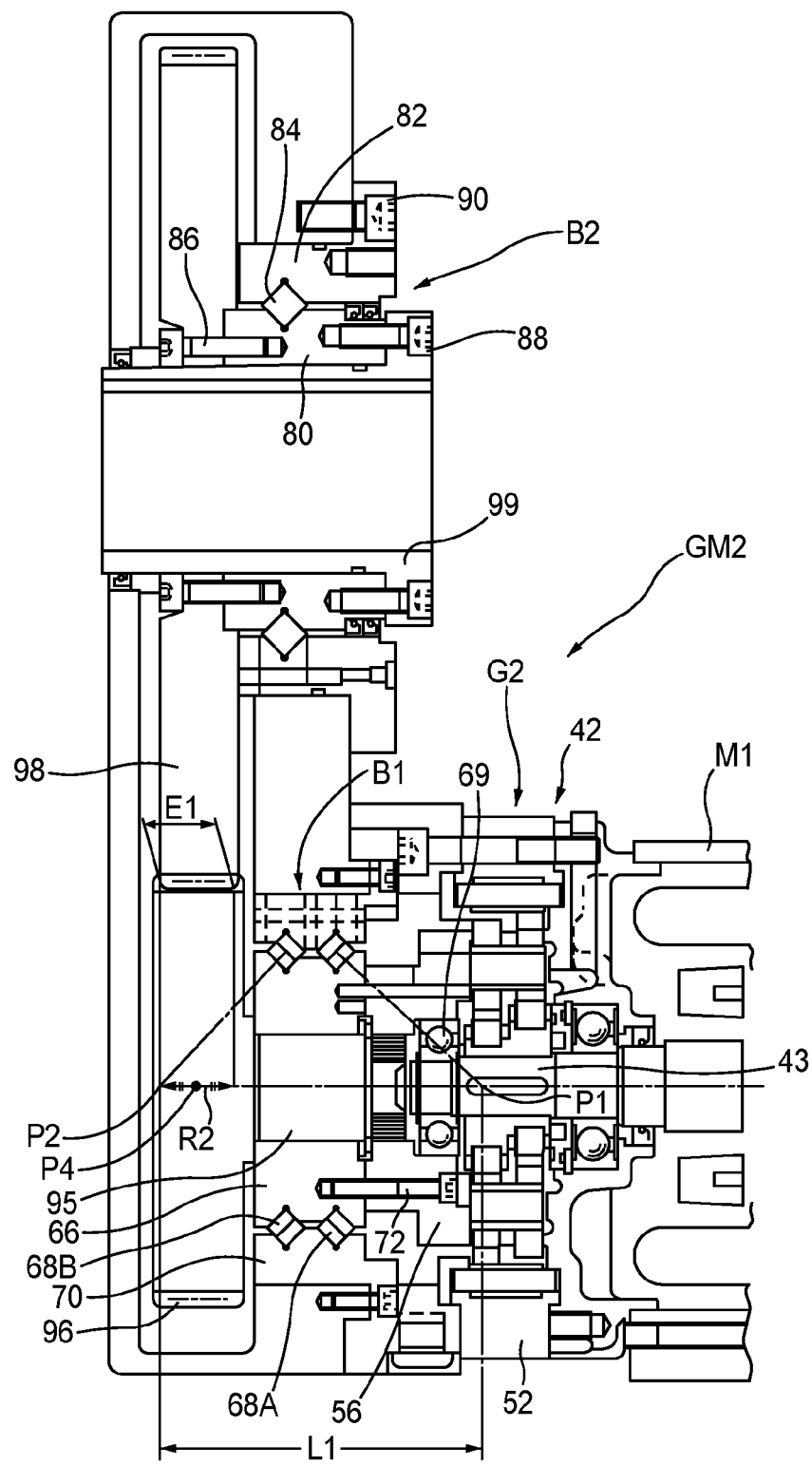
FIG. 3 is a sectional view of a reduction gear according to a second embodiment of the invention.
Figure 4:
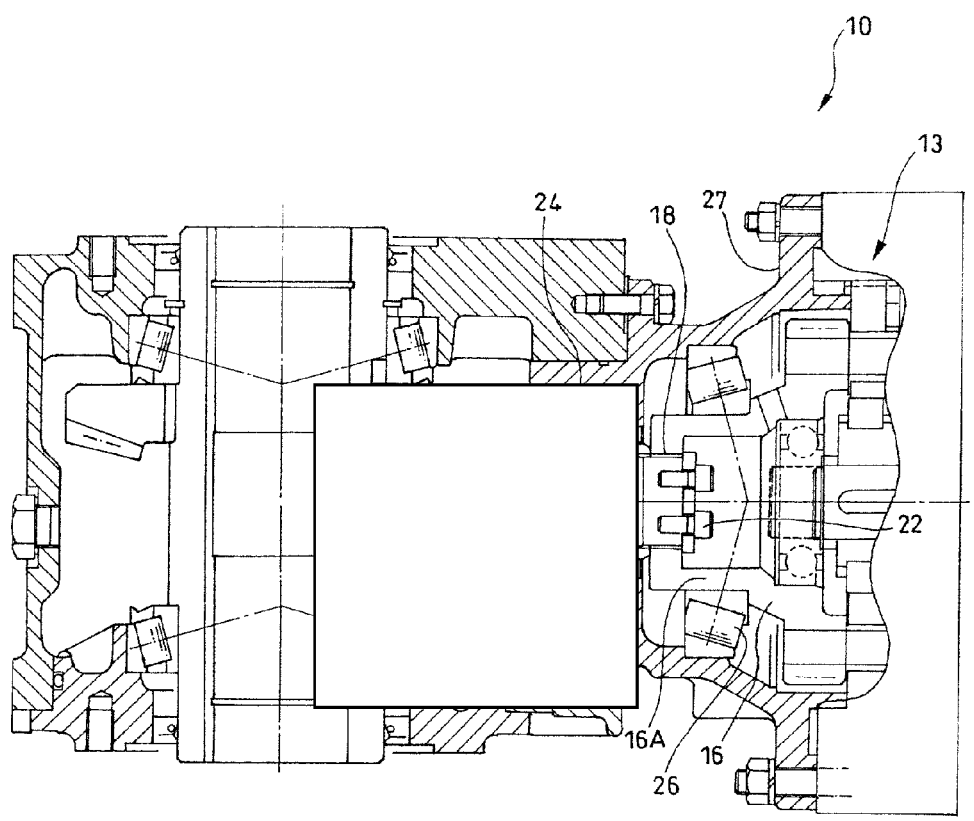
FIG. 4 is a sectional view showing an example of a supporting structure of a shaft of a conventional reduction gear.
Figure 5:
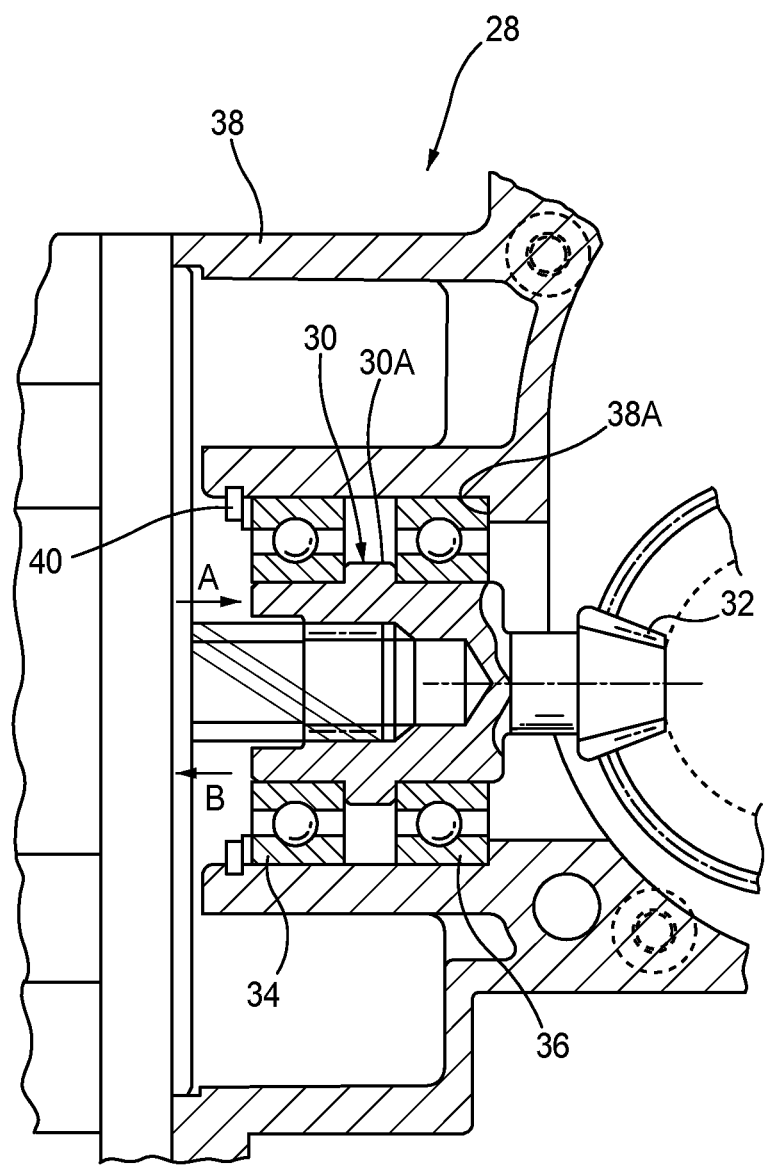
FIG. 5 is a sectional view showing another example of the supporting structure of a shaft of the conventional reduction gear.

Another embodiment of the invention is shown in FIG. 3.

In the reduction gear GM2 according to this embodiment, a spur pinion 96 is formed at the tip of a pinion shaft 95, and the spur pinion 96 meshes with a spur gear 98.

Even in this embodiment, the pinion shaft 95 equivalent to an input shaft at the subsequent stage is supported by the angular roller bearing B1 in a back-to-back combination having a contact angle of 45° which has already been described. The configuration of the angular roller bearing B1 itself is the same as that of the earlier embodiment. In this embodiment, a midpoint P4 of a projection range R2 of an meshing range E2 between the spur pinion 96 and the spur gear 98 on the pinion shaft 95 exists within the span L1 of the working points P1 and P2 of the angular roller bearing B1 which is combined back to back.

Therefore, even if a large radial load is applied from the spur pinion 96 side, or even if a thrust load is applied to the pinion shaft 95 for some reason, the loads in the radial direction and the thrust direction can be received by the angular roller bearing B1, and the pinion shaft 95 can be rotated in a significantly stable state. In addition, the configuration in which the inscribed meshing planetary gear mechanism 42 at the preceding stage of the speed reducer G1 and the pinion shaft 60 are supported, and the construction in which the output shaft 99 of the speed reduction mechanism 44 at the subsequent stage is supported are fundamentally the same as those of the earlier embodiment. Accordingly, main constituent parts in the drawing are denoted by the same reference numerals as those of the earlier embodiment, and duplicate description thereof is omitted.

In addition, the contact angle of the angular roller bearing according to the invention is not limited to 45°. The contact angle may be set in consideration of the balance between a radial road and a thrust load, the distance from the angular roller bearing to the meshing point between the first and second gears, etc. For example, when the ratio at which a radial road is applied is high, it is possible to set the contact angle to be smaller than 45°, and on the contrary, when the ratio at which a thrust load is applied is high, it is also possible to set a contact angle to 45° or more. However, the midpoint of the projection range of the range where the first and second gear mesh with each other on the first shaft needs to exist within the span of a line of action on the first shaft.

Further, although the double-row type single angular roller bearing has been adopted in the above embodiment, the angular roller bearing in the invention has only to be a bearing in which a pair of roller rows are incorporated (combined back to back), and is not necessarily a double-row type single bearing. Even if the number of bearings is two, the burden on each bearing can be made small by the invention. Thus, the span of bearing can be made small, and the effect that the axial length of the speed reducer can be shortened can be properly obtained.

A predetermined shaft in a speed reducer can be rotated and supported in a stable state while the loads in the radial direction and the thrust direction applied to the shaft are received by one bearing.

It should be understood that the invention is not limited to the above-described embodiment, but may be modified into various forms on the basis of the spirit of the invention. Additionally, the modifications are included in the scope of the invention.

We claim:

1. A supporting structure of a shaft of a reduction gear having within a casing a speed reduction mechanism formed by the meshing between a first gear provided at a tip of a first shaft and a second gear provided at a second shaft, the supporting structure comprising:
    an angular roller bearing which supports the first shaft provided with the first gear, the angular roller bearing having a pair of roller rows which are rolling elements incorporated in a back-to-back combination,
    wherein a midpoint of a projection range of a range where the first gear and the second gear mesh with each other on the first shaft is made to exist in a working point span of the pair of roller rows of the angular roller bearing on the first shaft.

2. The supporting structure of a shaft of a reduction gear according claim 1, wherein the first gear and the second gear are orthogonal gears.

3. The supporting structure of a shaft of a reduction gear according to claim 1, wherein a contact angle of the angular roller bearing is set to 45°.

4. The supporting structure of a shaft of a reduction gear according to claim 1, wherein the reduction gear includes a preceding stage speed reduction mechanism at a preceding stage of the speed reduction mechanism, an output member of the preceding stage speed reduction mechanism is fixed to an inner ring of the angular roller bearing, and the first shaft is fixed to the output member or the inner ring.

5. The supporting structure of a shaft of a reduction gear according to claim 4, wherein the angular roller bearing is a single bearing which has the pair of roller rows in a double row.

6. The supporting structure of a shaft of a reduction gear according to claim 1, wherein all of the projection range of the range where the first gear and the second gear mesh with each other on the first shaft exists in the working point span of the pair of roller rows of the angular roller bearing on the first shaft.

* * * * *